United States Patent
Smith

(10) Patent No.: US 10,733,736 B2
(45) Date of Patent: Aug. 4, 2020

(54) BODY SCANNER WITH AUTOMATED TARGET RECOGNITION

(71) Applicant: Steven Winn Smith, San Diego, CA (US)

(72) Inventor: Steven Winn Smith, San Diego, CA (US)

(73) Assignee: TEK84 INC., Poway, CA (US)

(*) Notice: Subject to any disclaimer, the term of this patent is extended or adjusted under 35 U.S.C. 154(b) by 599 days.

(21) Appl. No.: 15/157,253

(22) Filed: May 17, 2016

(65) Prior Publication Data

US 2017/0337447 A1    Nov. 23, 2017

(51) Int. Cl.
*G06K 9/00* (2006.01)
*G06T 7/00* (2017.01)
(Continued)

(52) U.S. Cl.
CPC .......... *G06T 7/0042* (2013.01); *G01V 5/0008* (2013.01); *G06K 9/00771* (2013.01);
(Continued)

(58) Field of Classification Search
CPC .......... G06K 9/00362; G06K 9/00369; G06K 9/00375; G06K 2209/19; G06K 2209/21; G06K 9/4604; G06K 9/4671; G01V 5/0008; G01V 5/0016; G01V 5/0025; G01V 5/0033; G01V 5/0041; G01V 5/0066; G06T 2207/10116; G06T 2207/30196; G06T 2207/30108; G06T 2207/30232; G06T 7/10; G06T 7/12; G06T 7/13149; G06T 7/155; G06T 7/181; G06T 2207/20112;
(Continued)

(56) References Cited

U.S. PATENT DOCUMENTS 6,888,564 B2 * 5/2005 Caviedes ............. H04N 17/004
348/180
7,558,370 B2 * 7/2009 Sommer, Jr. ......... G01V 5/0016
378/57

(Continued)

OTHER PUBLICATIONS

Seo et al., "An Automatic Modeling of Human Bodies from Sizing Parameters", Apr. 2003, ACM, Proceedings of the 2003 Symposium on Interactive 3D graphics, p. 19-26. (Year: 2003).*

*Primary Examiner* — Vincent Rudolph
*Assistant Examiner* — Timothy Choi
(74) *Attorney, Agent, or Firm* — Sheppard, Mullin, Richter & Hampton LLP

(57) ABSTRACT

This Invention is directed at the automated analysis of body scanner images. Body scanners are used in airports and other secured facilities to detect weapons, explosives, and other security threats hidden under persons' clothing. These devices use x-rays, millimeter waves and other radiant energy to produce an electronic image of the person's body and any concealed objects. Examination of these images by human analysts is slow, expensive, and subject to privacy concerns. The Invention provides automated analysis of body scanner images by recognizing that human anatomy is bilaterally symmetric to a high degree, while concealed objects are asymmetric. Digital techniques are used to separate the scanned image into its symmetric and asymmetric parts, thereby effectively separating anatomic from non-anatomic image features.

16 Claims, 11 Drawing Sheets

(51) Int. Cl.
*G06T 7/68* (2017.01)
*G01V 5/00* (2006.01)

(52) U.S. Cl.
CPC ...... *G06T 7/68* (2017.01); *G06T 2207/10116* (2013.01); *G06T 2207/30196* (2013.01); *G06T 2207/30232* (2013.01)

(58) Field of Classification Search
CPC . G06T 2207/20116; G06T 2207/20121; G06T 2207/20124; G06T 2207/20164; A61B 5/117; A61B 5/1171
See application file for complete search history.

(56) References Cited

U.S. PATENT DOCUMENTS

| | | | |
|---|---|---|---|
| 2007/0235652 A1* | 10/2007 | Smith | G01V 5/0083 250/363.02 |
| 2008/0021502 A1* | 1/2008 | Imielinska | A61B 6/032 607/1 |
| 2008/0144885 A1* | 6/2008 | Zucherman | G06K 9/00369 382/103 |
| 2014/0086448 A1* | 3/2014 | Vaidya | G06K 9/621 382/103 |
| 2015/0030205 A1* | 1/2015 | Chen | G06K 9/00771 382/103 |

* cited by examiner

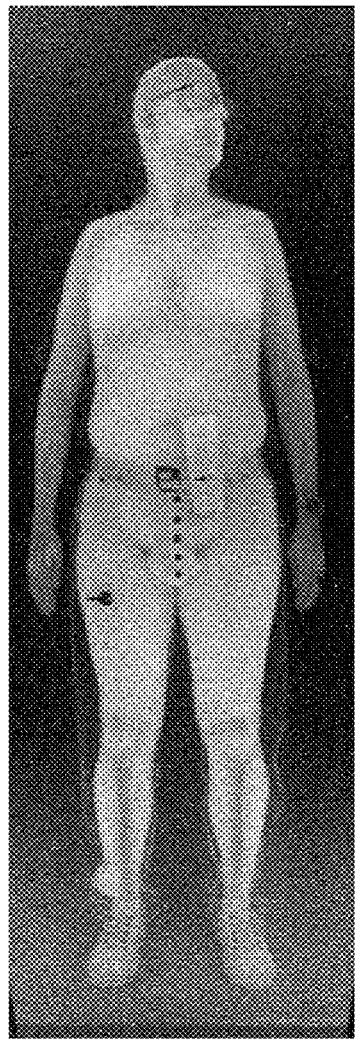
30
PRIOR ART
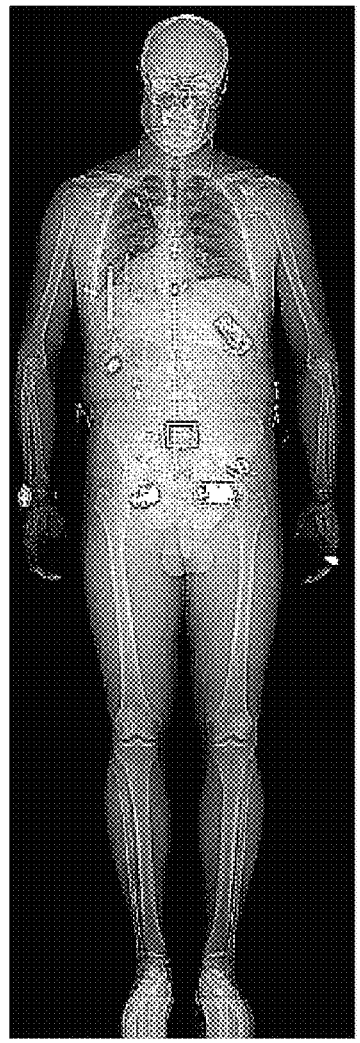
31
FIG. 2
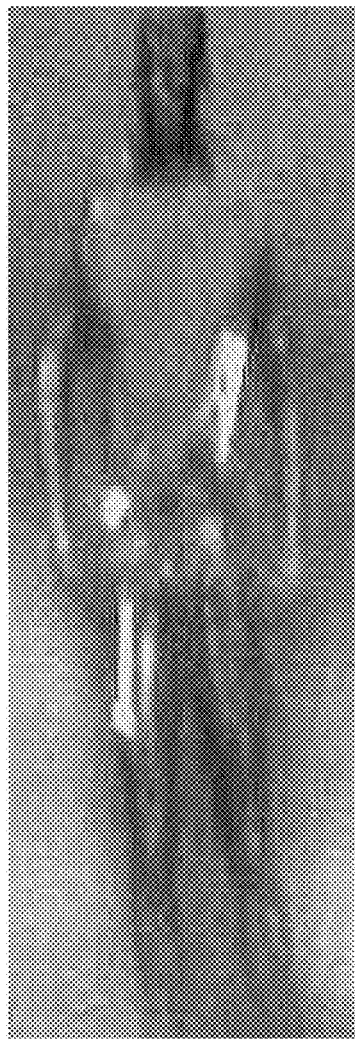
32

BODY SCANNER WITH AUTOMATED TARGET RECOGNITION

This application claims the benefit under 35 U.S.C. § 119(e) of U.S. provisional patent application Ser. No. 62/179,918 filed with the USPTO on May 22, 2015, the content of which is incorporated herein by reference in its entirety.

BACKGROUND OF THE INVENTION

This invention relates to screening persons for security threats through the automated analysis of body scanner images.

A variety of body scanners have been developed to detect weapons, explosives and contraband concealed under the clothing of persons entering security controlled areas. These devices operate by detecting radiant energy that has been modulated by or emitted from the body of the person being examined. Radiant energies used include: x-rays, microwaves, millimeter waves, infrared light, terahertz waves, and ultrasound. In a typical operation, the person being examined is actively exposed to a beam of millimeter waves or x-rays. A portion of this radiant energy interacts with the person, their clothing, and any concealed objects they may be carrying. This interaction modulates the radiant energy reflected from, scattered by, or transmitted through the person. This reflected, scattered or transmitted radiant energy is collected by sensitive detectors, and the resulting electronic signals are routed to a digital computer. Alternatively, some body scanners operate passively, collecting radiant energy that has been thermally emitted from the person's body and surrounding area. Examples of this are infrared and millimeter wave sensitive cameras. Regardless of active or passive operation, body scanners convert the electronic signals from their detectors into digitally represented images of the person's body. In these images the clothing is essentially transparent, allowing the security officer to visualize objects that are concealed underneath the clothing. Commercial body scanners include the model AIT84, sold by Tek84 Engineering Group, San Diego, Calif.; model SECURE 1000, sold by Rapiscan Security Products, Torrance, Calif.; model SmartCheck, sold by American Science and Engineering, Billerica, Mass.; model ProVision, sold by L-3 Communications, Woburn, Mass.; and model Eqo, sold by Smiths Detection, Edgewood, Md.

FIG. 1 shows examples of the wide variety of body scanner configurations. In one configuration 100, the person being screened 12 stands motionless within the apparatus 101 performing the scan. In another configuration 102, the person 12 stands next to the scanning device 103. In yet another configuration 104, the person 12 walks along a path 20 through an archway body scanner 105. Many other configurations are possible, including: cameras detecting infrared or microwave energy, the person being screened turning their body in front of a scanning panel, and standoff systems where the person is scanned from a considerable distance from the apparatus. Examples of body scanner images are shown in FIG. 2, created from backscatter x-rays 30, transmitted x-rays 31, and passive microwaves 32.

In spite of using different radiant energies and imaging geometries, body scanners detect concealed objects in the same fundamental way: they create an electronic image of the person with the clothing being essentially transparent. This electronic image is composed of bits of digital information, which may reside in a storage medium, computer processing unit, or other device capable of retaining such data. For image storage this may be done in a common file format, such as jpg, bmp, or gif. Within a computer processing unit the storage will typically be pixel values ordered in a row and column arrangement. The electronic image can be manipulated directly in digital form, or converted to a visual image by devices such as image printers and video monitors. As used here, and commonly in the art, the term "image" refers to the bits of digital information residing in a digital device, the visual display of this information on a video monitor, the printed image corresponding to this digital information, and other such data presentations. These concepts of digitally representing and manipulating images are well known in the art of image processing.

All body scanners incorporate a digital computer 18, as shown in FIG. 1 that receives or otherwise acquires an electronic image from the imaging assemblies. In the most basic operation, this electronic image is displayed on a monitor 16, either mounted directly on the scanning apparatus or located in close proximity. The security officer 14 evaluates the displayed image through his innate and trained ability to recognize the normal visual appearance of the human body. That is, the security officer knows what the human body looks like and can therefore detect objects appearing in the displayed image that do not correspond to human anatomy. In addition, from his training and experience in society, the security officer can often recognize which of the concealed objects are benign and need no investigation, such as wallets, watches, coins, buttons on the clothing, and so on. If the security officer observes an object that is not a part of the subject's body, and is not recognized as benign, the security officer confronts the subject to determine if the object is a prohibited item. This may be as simple as asking the subject to remove the item from within their clothing, or as invasive as a strip search. The method of resolution depending on the characteristics of the object observed and the policies of the security facility being entered.

Body scanners are capable of detecting a wide range of security threats and contraband; however, the required image interpretation by the Security Officer presents a multitude of problems and difficulties. The manpower requirement to operate these systems is very high, requiring a security officer to be present to analyze each image. This is aggravated by the specialized training each security officer must go through to be proficient in the image analysis. The inherent limitations of human image analysis, and the nature of this work, promotes errors and deficiencies in the security screening process. For instance, security officers may become distracted or tired and miss concealed objects. In a worse scenario, a security officer may be bribed or coerced to ignore concealed objects. Further, human image analysis requires that the examination area be large enough to accommodate the extra security officer. Further, humans require about ten seconds to process each image, which can slow the throughput of the security checkpoint. Still further, some persons object to an electronic image of their unclothed body being displayed and viewed by the security officer.

FIG. 3 illustrates a configuration directed at overcoming these problems of operator image interpretation, commonly known as "Automated Target Recognition," or ATR. In this approach the human operator is replaced by a digital computer running specialized software 90. The electronic image 70 produced by the body scanner contains a digital representation of the person's body 71, as well as any concealed objects 72, 73. This digital information 74 is passed into a digital computer 90. This may be the computer 18 operating the body scanner 105 as shown in FIG. 1, or a separate device connected to the apparatus through a communication network. The goal of ATR software is to discriminate between features in the image that correspond to the person's anatomy 71, and features that correspond to concealed objects 72, 73. The result of this operation is digital data 84 representing only the concealed objects, and not the human body. The Security Officer operating the body scanner is then presented with this information 84 in some convenient way. Most commonly, this is done through a graphical representation 80 displayed on the system's monitor 18. A generic humanoid outline 81 may be used to provide positional reference. However, this outline 81 is the same for all persons being scanned, and does not correspond to the anatomy 71 of the particular human body being examined. Also most commonly, concealed objects 72 73 in the electronic image 70 are displayed to the operator as boxes 82 83, respectively, or some other pattern in the graphical display 80.

ATR can thus be viewed as a filter: it receives information containing anatomy plus non-anatomy, separates the two, and passes only the non-anatomy to the operator. All of these operations are commonplace in computer technology, except for a key problem: how to discriminate between anatomic 71 and non-anatomical objects 72 73. This can be statistically measured in terms of the probability of detecting certain types of concealed objects, versus the false alarm rate. A well performing system detects a high percentage of the concealed objects with minimal false alarms. Conversely, a poorly performing system has a low detection probability, and a high false alarm rate. Humans perform exceedingly well at this task with a seemingly trivial effort. This can be appreciated simply by looking at the high-quality body scan image 80 in FIG. 3. The human brain can immediately separate the person's body from the concealed objects. In stark comparison, prior art ATR has surprisingly poor performance at this task. While the numbers are arguable, in can generally be said that the capability of prior art ATR is orders-of-magnitude below that of human image interpretation. The reasons for this have not been known; it has been a longstanding and frustrating mystery to the scientists and engineers working in the field.

This problem has placed severe limitations on the use of body scanners. Security personnel at airports, military bases and Government facilities have been faced with undesirable alternatives. One alternative is to use body scanners with human image analysts, providing excellent detection capability and few false alarms. However, they also must accept the associated manpower problems, long analysis times, and privacy concerns. The other alternative has been to use body scanners with prior art ATR. This provides high-throughput, reduced personnel requirements and far better privacy to the person being screened. However, in this alternative, the primary purpose of the body scanner is largely defeated, a result of the poor detection probability and frequency false alarms. A third alternative, which is often selected, is to not use body scanners because of the unacceptable problems of either using, and not using, prior art ATR. Indeed, the performance of ATR is the critical factor in the widespread use of body scanners in security facilities.

BRIEF SUMMARY OF THE INVENTION

The Present Invention is based on using previously unappreciated information contained in body scanner images. Using this information, in conjunction with inventive computer algorithms, the Present Invention achieves a level of ATR performance that rivals the abilities of human image analysts. In all likelihood, the method of the Present Invention mimics at least some portion of the operation of the human brain for this task.

The anatomy of the human body is highly symmetric around the vertical axis. That is, the left side of the body is an extremely good match to its right side. This is often referred to as bilateral symmetry. In contrast, objects concealed under the clothing are essentially asymmetric with respect to the body's vertical axis. In one embodiment, the Present Invention is a digital computer, running software that separates the electronic image produced by a body scanner into its bilateral symmetric and asymmetric components. Accordingly, this is an extremely efficient method of separating anatomic versus non-anatomic features within the image, the enabling requirement for ATR.

In another embodiment, a first feature within the body scanner electronic image is identified. This first feature may be the brightness of an area, the strength of an image edge, a measure of the image texture, a value representing the shape of the body outline, or other characteristics known to those in the field of digital image processing. The location of this first feature is identified with respect to the body's vertical axis of symmetry. The corresponding symmetrical location, on the body, in the electronic image, is then identified. That is, if the first feature is on the left, the corresponding bilateral symmetrical location is on the right, equal distance from the vertical axis of symmetry. Likewise, if the first feature is on the right, the corresponding symmetrical location will be on the left. This corresponding symmetrical location is then searched for the presence of a second feature, which matches the characteristics of the first feature. That is, the first and second features are both evaluated by the same criteria, such as: brightness, edge sharpness, size, texture, and so on. A comparison is then made between the characteristics of the first and second features. If the two features match, within a specified margin of error, the first feature is deemed to be a result of anatomy, and discarded from further consideration. However, if the first feature does not match the second feature, or the second feature is essentially not present, the first feature is considered to be non-anatomic. Accordingly, the location of the first feature is presented to the security officer operating body scanner as indicative of a concealed object.

In yet another embodiment, the outline of the body in the electronic image is identified, and fiducial points along this outline are found. Using mathematical techniques, such as the Affine transform or bilinear warping, these fiducial points allow the electronic image to be digitally warped into a second image. Within the second image the body's vertical line of symmetry coincides with the vertical centerline of the second image. This procedure eliminates shift, tilt, and rotation variations that appear in the acquired image as a result of the person not standing perfectly symmetrical with respect to the body scanner. Eliminating these variations facilitates the identification of symmetrical versus asymmetrical image features, such as by the methods described above.

It is therefore the goal of the Present Invention to provide an improved method and apparatus for detecting security threats concealed under the clothing of a person entering a security controlled area. Another goal of the Present Invention is to provide improved ATR capability for body scanners. Yet another goal is to use a previously unappreciated source of information in the body scanner electronic image to greatly improve the performance of ATR. Still another goal is to mimic the highly effective operation of the human brain in the analysis of body scanner images. A further goal is to provide anatomic versus non-anatomic discrimination through symmetric versus asymmetric image separation. Yet another goal is to eliminate the need for humans to view and analyze body scanner images.

BRIEF DESCRIPTION OF THE DRAWINGS

FIG. 2 is a depiction of the prior art.

DETAILED DESCRIPTION OF THE INVENTION

Figure 4:
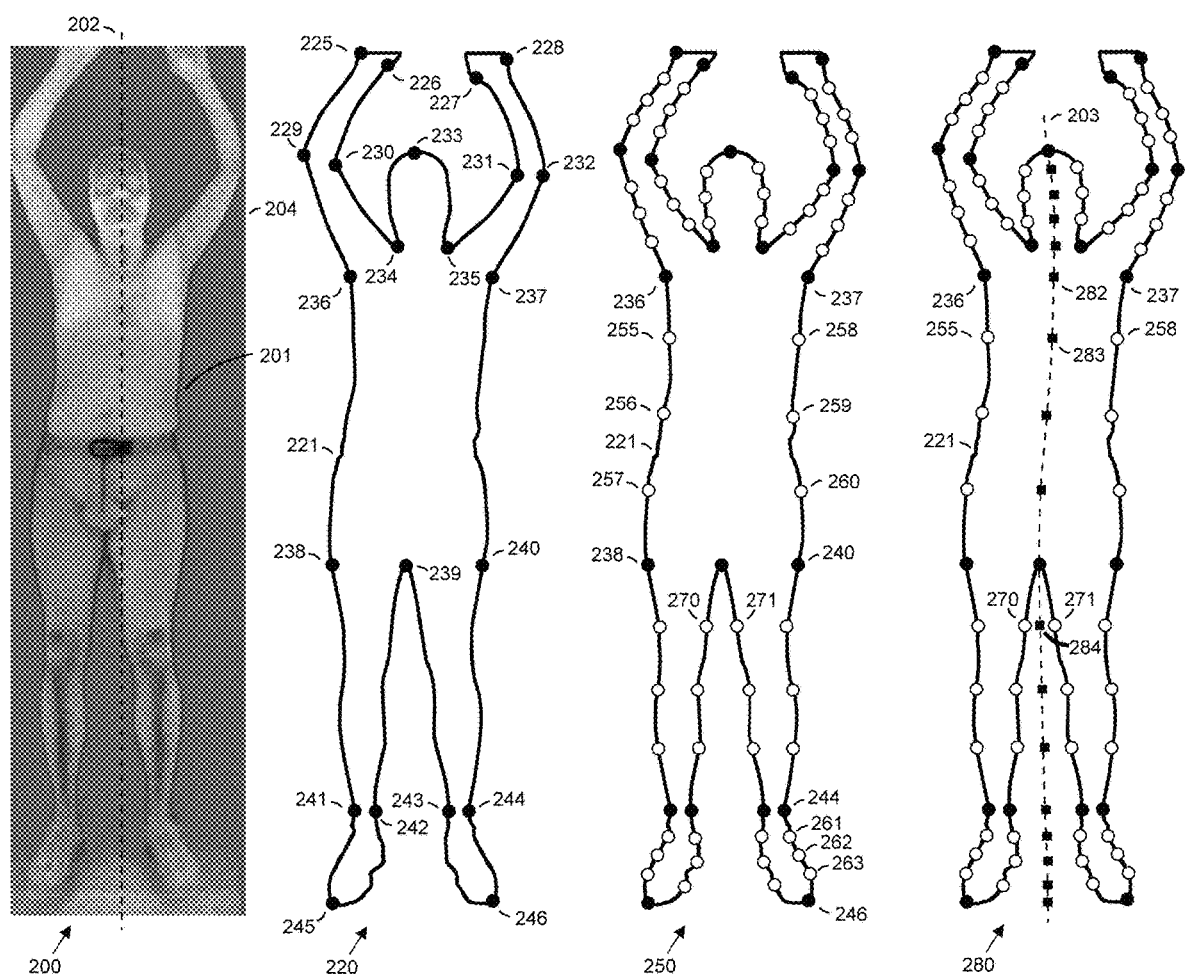
FIG. 4 is a depiction in accordance with the Present Invention.

FIGS. 4 through 8 show sequential steps that describe the general operation of the Present Invention, as well as a preferred embodiment. The leftmost illustration 200 in FIG. 4 shows an image 204 produced by a body scanner, along with the vertical centerline 202 of the image. As can be seen, the displayed body 201 is generally symmetrical between its left and right sides, but the line of symmetry deviates from the centerline 202 of the image. FIG. 4 also shows illustrations of three sequential computer processing steps 220 250 280. The outline 221 of the body 201 is first generated. The algorithms for performing this step are well known in the art of digital image processing, such as thresholding, edge detection and morphological operations. The exact nature of this step depends on the characteristics of the particular type of body scanner being used. In a preferred embodiment, the electronic image 204 comprises spatially aligned backscatter and transmission images, such as produced by the previously mentioned AIT84 and SmartCheck products. In this embodiment the outline 221 of the body can be obtained by thresholding the transmission image to generate a silhouette of the body, followed by an edge detection routine. In any event, the types of operations and techniques to generate the body outline 221 from the body 201 are well known in the art. The resulting outline 221 may be represented by pixel values in a digital image, a mathematical equation, or other way of specifying the location of the body edge. In the preferred embodiment, the outline 221 consists of pixel values in a digital image with about four times the spatial resolution of the original image 204. For example, if the original digital image 204 is composed of 150 by 600 pixels, the outline data 220 would be an image of 600 by 2,400 pixels, thereby providing subpixel localization of the body edge. The data sets of the subsequent operations 250 280 have this same preferred representation.

In a second step, the primary fiducial markers 225-246 are identified on the outline 221. These are located through common image processing algorithms looking for specific image features. In a preferred embodiment, the wrists 225 226 227 228 and ankles 241 242 243 244 are defined by locating the narrowest point across the limb. The inside and outside of the elbows 229 230 231 232, and the tips of the feet 245 246 are identifiable by the abrupt change in slope of the outline 221. The neck 234 235 and groin 239 are readily located as the lowest and highest points in the local region, respectively. The armpits 236 237 are determined by starting at the neck fiducials 234 235, respectively, and moving outward and down until intersecting the outline 221. Likewise, the hip fiducials 238 240 are at the location on the outline 221 with the same height as the groin 239. The top of the head is located by finding the best-fit circle matching the top of the head, then constructing a line between the center of this circle and the midpoint between the neck fiducials 234 235. The top of the head is then identified as the point where this line intersects the outline 221. Algorithms to carry out these steps are routinely known in digital image processing, have many variations, and are tailored to the particular type of body scanner being used.

The third step shown in FIG. 4 is to locate a large number of secondary fiducial markers 255-263 from the location of the primary fiducial markers 225-246 and the body outline 221. This operation will be explained by using the primary fiducials in the armpit 236 and hip 238 as an example. The path of the body outline is traced from the armpit 236 to the hip 238. This path-length is divided into fourths, providing the location of three secondary fiducials 255 256 257. Likewise, on the other side of the body, the path-length between primary fiducials at the armpit 237 and hip 240 is divided into fourths, to locate three additional secondary fiducials 258 259 260. Another example shown of this is the primary fiducials for ankle 244 and toe 246 being used to locate additional secondary fiducials 261 262 263. This operation is carried out on all adjacent primary fiducials in the image, in the same manner as in these three examples. This description breaks each path-length into fourths; however, this is only for simplicity of explanation. In the preferred embodiment, the path length between each pair of adjacent primary fiducials is broken into several hundred segments, providing the location of several hundred secondary fiducials. This makes the distance between adjacent secondary fiducials smaller than the pixel spacing of the electronic image that is representing this data. That is, the totality of the primary and secondary fiducials trace the body outline 221 to subpixel accuracy. In the following steps there is no distinction between primary and secondary fiducials, and they are referred to jointly as "fiducials."

A key feature of this multitude of fiducials is that they occur in identifiable symmetry pairs. For example, the two armpit fiducials 236 237 form such a pair. As shown in the data representation 280, the midpoint 282 between these fiducials 236 237 is located on the body's axis of symmetry 203 of the body outline 221. Likewise fiducials 255 and 258 form a symmetry pair around midpoint 283, and fiducials 270 271 form a symmetry pair around midpoint 284. Put in other words, the vertical axis of symmetry 203 of the body outline 221 can be calculated as all of the midpoint locations [e.g., 282 283 284] of all the symmetry pairs [e.g., 236 and 237, 255 and 258, 270 and 271, respectively].

Figure 5:
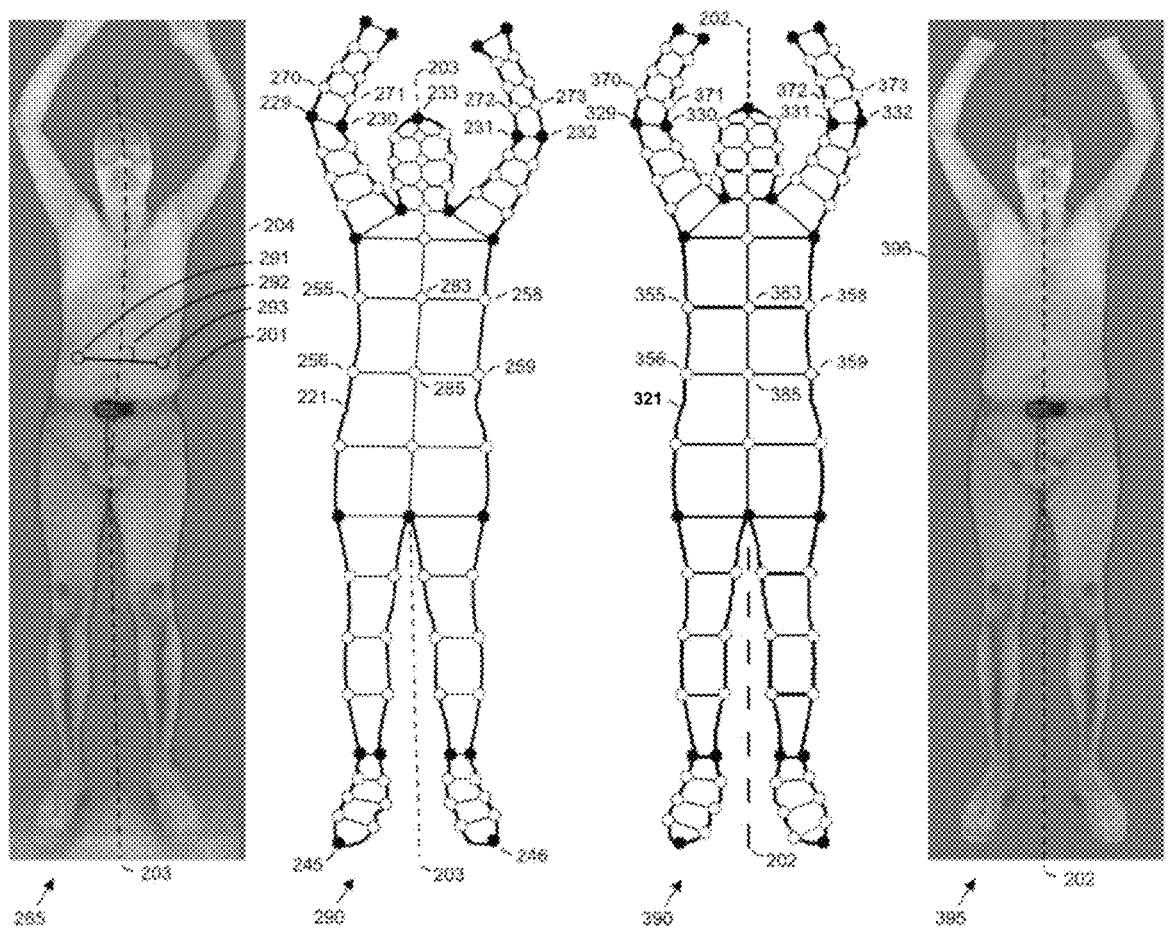
FIG. 5 is a depiction in accordance with the Present Invention.

This axis of symmetry 203 of the body outline 221 is used in a variety of ways in the Present Invention. A wide variety of algorithms are known in the field of image processing to detect specific image features. For example, thresholding can detect regions that are unusually bright or dark; edge detection can locate the discontinuity between dissimilar regions, and corner detectors are capable of isolating right-angle patterns in the image. In a preferred embodiment, a first step is to use a selected algorithm to identify features in the image which may be indicative of a concealed object. Most detection algorithms compare their output against a preset threshold, which must be exceeded to indicate that the feature has been detected. If the threshold is set low, even weak occurrences of the pattern will be detected. However, this will enviably result in many false alarms being generated. Conversely, setting the threshold high will reduce the false alarms, but result in some or all of the occurrences of the pattern being missed. The leftmost illustration 265 in FIG. 5 shows the acquired image 204 with the axis of symmetry 203 identified, as previously described. The body scanner image 204 is analyzed by the selected feature detection algorithm, using sufficiently low threshold to trigger on essentially all concealed objects. This will unavoidably result in dozens or hundreds of false alarms per image from this single algorithm. One such triggering location 291, as an example, is shown in FIG. 5. The numerical value produced by the feature detection algorithm at this trigger location 291 is recorded for use in later steps. A second step in this preferred embodiment is to calculate the axis of symmetry 203, as previously described.

Figure 1:
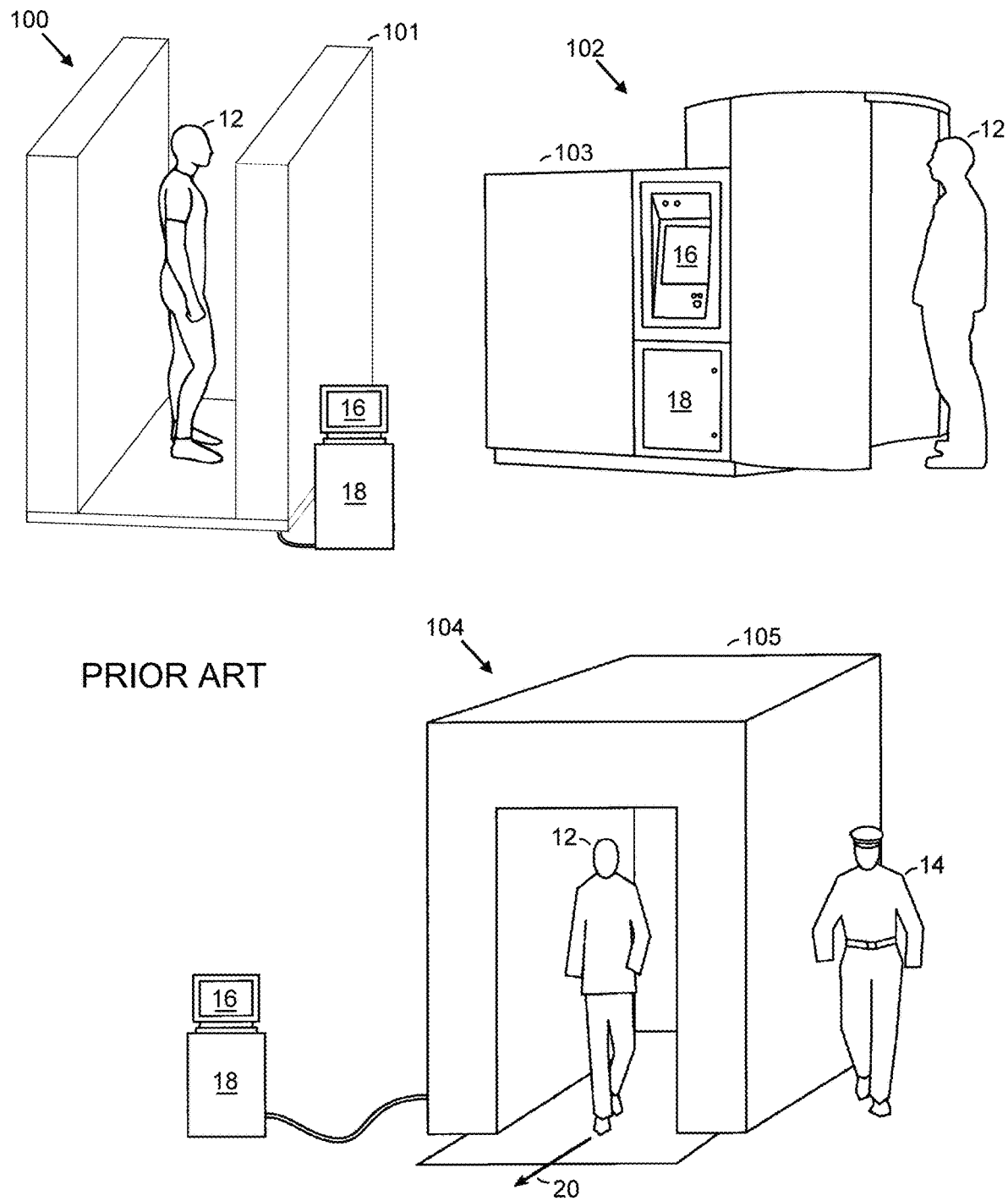
FIG. 1 is a depiction of the prior art.
Figure 3:
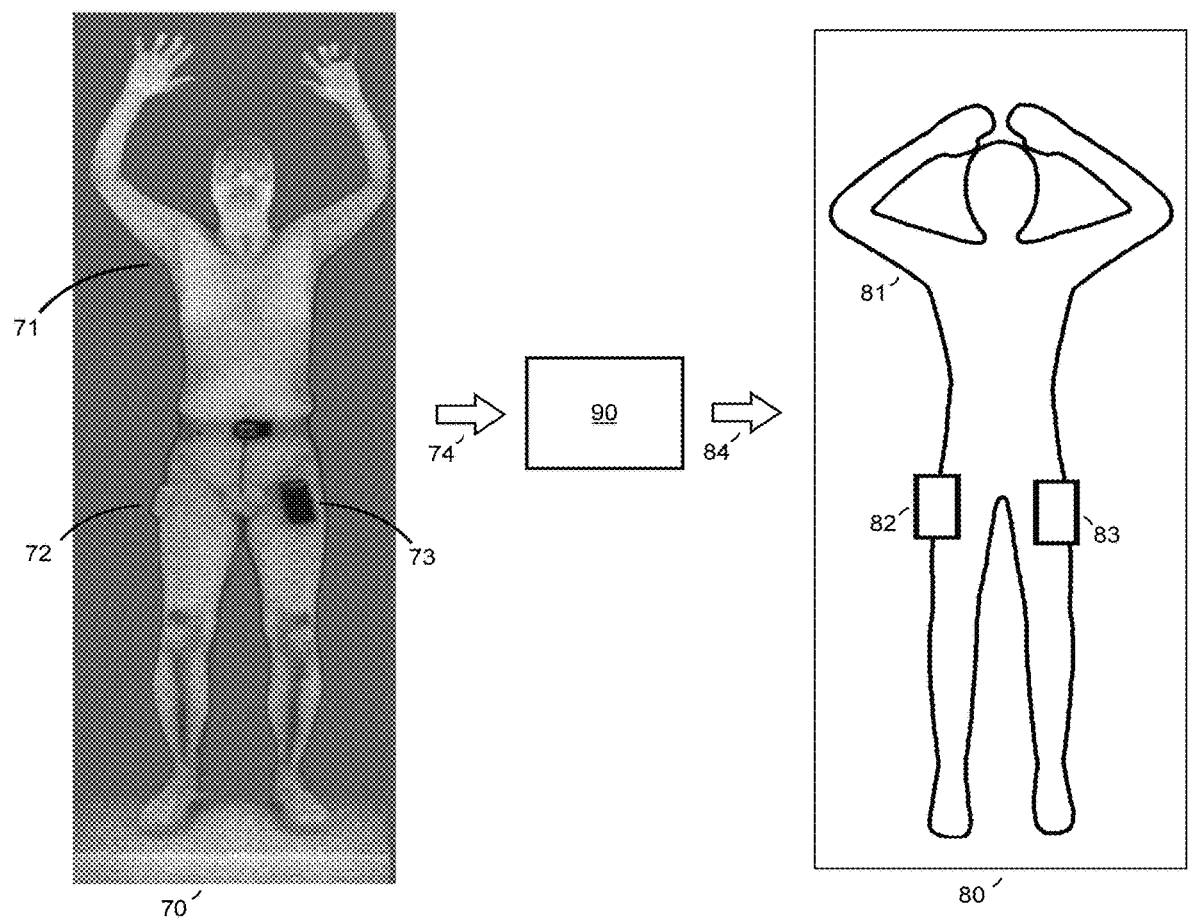
FIG. 3 is a depiction in accordance with the Present Invention.

In the third step, the computer determines the corresponding symmetrical location 293 on the body, based on the known triggering location 291 and known axis of symmetry 203. This is calculated as the location, on the opposite side of the image, that is the same distance from the axis of symmetry 203 as the triggering location 291, and forming a connecting line that is at right angles 292 to the axis of symmetry. In the fourth step, the selected feature detection algorithm is performed at the corresponding symmetrical location. If the featuring being sought has spatial orientation associated with it, such as an edge or corner, the spatial orientation of the detection algorithm is flipped left-for-right for this step. This is done to match the symmetry of the human body, where a localized region of anatomy on the left side of the body matches the corresponding anatomy on the right side of the body, but flipped left-for-right. The numerical value produced by the feature detection algorithm at this corresponding symmetrical location 293 is recorded for use in the next step. Step five is a comparison of the numerical values at the trigger location 291 and the corresponding symmetrical location 293. The goal is to determine if matching symmetrical features are present at the two locations. If they are, the ATR software classifies the triggering location 291 as being representative only of anatomy. If they are not, the triggering location 291 is classified as containing a concealed object. A variety of methods can be used to determine if a matching feature has been detected, such as subtracting the two numerical values, taking the absolute value, and performing a threshold. Other methods can involve nonlinear comparison criteria. In the preferred embodiment, this is carried out by dividing the numerical value produced by the detection algorithm at triggering location 291, by the numerical value produced at the corresponding symmetrical location 293. If the result is approximately one, a match has occurred. Otherwise, no match has occurred. As previously described and known in the art, the concealed objects can then be displayed in a graphical or other form to inform the scanner operator of the results. Accordingly, these five steps implement ATR, as previously defined in the discussion of FIG. 3. That is, the body scanner image 70 has been converted into a graphical display 80, which indicates the presence 82 83 of the concealed objects 72 73. This is achieved by software operating in a digital computer 90 to carry out the described steps.

As shown in FIG. 5, the previously described preferred embodiment operates completely in the coordinate system of the image produced by the body scanner. That is, relevant locations are specified by the row and column number, or sub-pixel interpolations thereof, of this digital image. This includes the image of the body 201, the trigger location 291, the corresponding symmetrical location 293, the axis of symmetry 203, and so on. In another preferred embodiment the coordinate system of the electronic image 204 is spatially warped into a new coordinate system, producing a warped electronic image 396 that has left-right symmetry around the image centerline 202. This step facilitates the comparison of features on the left and right sides of the body, as well as enabling additional detection methods.

Image warping is a well-known technique in the art of image processing. FIG. 5 shows three illustrations 290 390 395 that describe this process. The original electronic image 204 is represented by a multitude of fiducials 290, which are connected to form a mesh of quadrilaterals over the image. Each of the fiducials is shifted to a new location 390 through a specified algorithm, thereby warping the mesh of quadrilaterals into a new spatial coordinate system. In the Present Invention this new coordinate system has the important characteristic of left-right symmetry. To complete the process, the bilinear transform is used to map each pixel location in the original electronic image 265 to a warped pixel location in the warped image 395. This allows the grayscale information to be moved from the original to the warped coordinate system, thereby forming a warped image 395 with left-right symmetry with respect to the body. While warping one image into another is a common technique, there are details that are unique to the Present Invention. Specifically, the method for determining the placement of the fiducials on the original electronic image 265 is unique to the characteristics of body scanner images. Likewise, so is the algorithm for determining how the fiducials map from their location 290 in the original electronic image coordinates to those of the warped image coordinates 390. Accordingly, the method used in the Present Invention to accomplish these tasks is not known in the art, and is part of the Present Invention. On the other hand, once the fiducial locations are known in the two coordinate systems, the use of the bilinear or Affine transform, or similar methods, to transfer grayscale information is well known in the art.

In more detail, the body outline with fiducials 290 is calculated as previously described. Interconnecting lines are drawn between adjacent fiducials thereby dividing the image into quadrilaterals. What is most important, the quadrilaterals occur in symmetry pairs. For example, the quadrilateral defined by the four fiducials 255 256, 283 285 is part of a symmetry pair with the quadrilateral defined by the four fiducials 258 259 283 285, respectively. This results from the individual fiducials being symmetry pairs, as previously described. That is, fiducials 255 and 258 form a symmetry pair, as do fiducials 256 and 259. Fiducial 283 is a symmetry pair with itself, as is fiducial 285, and they appear in both quadrilaterals. As another example the quadrilateral defined by fiducials 270 271 229 230 is a symmetry pair with the quadrilateral defined by 273 272 232 231, respectively, with the respective fiducials being symmetry pairs.

Figure 6:
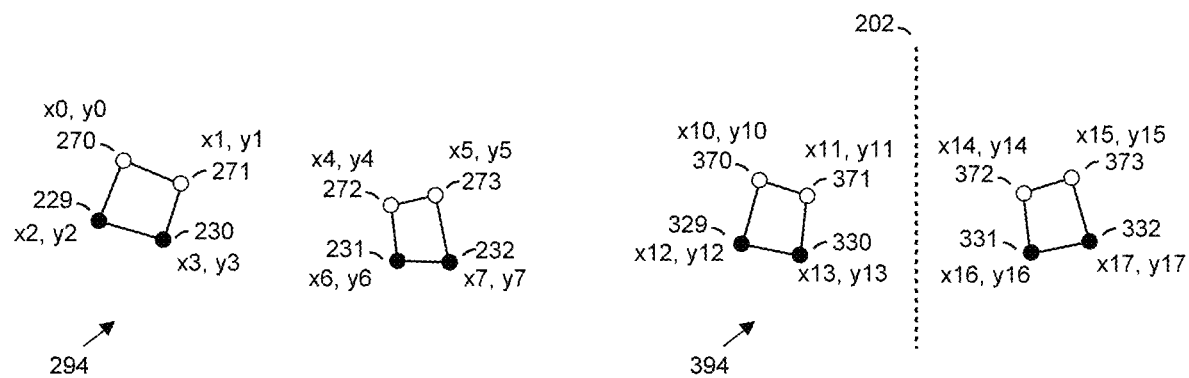
FIG. 6 is a depiction in accordance with the Present Invention.

The next step is to convert each quadrilateral symmetry pair from the original coordinates 290 to the warped coordinates 390. FIG. 6 illustrates this procedure, where the original quadrilaterals 294 have fiducials located at generalized coordinates: x0, y0; x1, y1; x2, y2; x3, y3 and x4, y4; x5, y5; x6, y6; x7, y7, which correspond to our particular example of 270 271 229 230 and 273 272 232 231, respectively. In FIG. 6 the fiducials of the warped quadrilaterals 394 are located at generalized coordinates: x10, y10; x11, y11; x12, y12; x13, y13 and x14, y14; x15, y15; x16, y16; x17, y17, which corresponds to our particular example of 370 371 329 330 and 373 372 332 331, respectively. This conversion is done on a fiducial pair basis. For example, fiducials x10, y10 and x15, y15 are calculated only from x0, y0 and x5, y5. Likewise, as another example, fiducials x13, y13 and x16, y16 are calculated only from x3, y3 and x6, y6. The location of each y value in the warped coordinates is equal to the average of the y values in the original coordinates. For examples, y10=(y0+y5)/2, and y16=(y3+y6)/2. The algorithm for converting the x value is selected to accomplish two things, (1) place the fiducial pairs the same horizontal distance apart in the warped and original coordinates, and (2) place the warped fiducial pairs symmetrically round the centerline 202. This is accomplished through calculation, for example: x10=CL−(x5−x0)/2, x15=CL+(x5−x0)/2, and x13=CL−(x6−x3)/2, x16=CL+(x6−x3)/2, where CL is the centerline of the image.

Referring again to FIG. 5, the above procedure describes how to convert each of the quadrilateral symmetry pairs from the original coordinates 290 to the warped coordinates 390 (within/on body outline 321, e.g., the quadrilaterals formed by 355, 356, 383, and 385, as well as the quadrilaterals formed by 358, 359, 383, and 385). The warped image 396 is then calculated through use of the bilinear transform, knowing the original electronic image 204, the location of the quadrilaterals defined in image 290, and the location of the warped quadrilaterals 390. This procedure is well known in the art of image processing, and is provided as a standard function in many image processing toolkits, such as Matlab. Many variations are possible that accomplish the same result, all known in the art. These include breaking each of the quadrilaterals into two triangles, and then applying an Affine transform.

Figure 7:
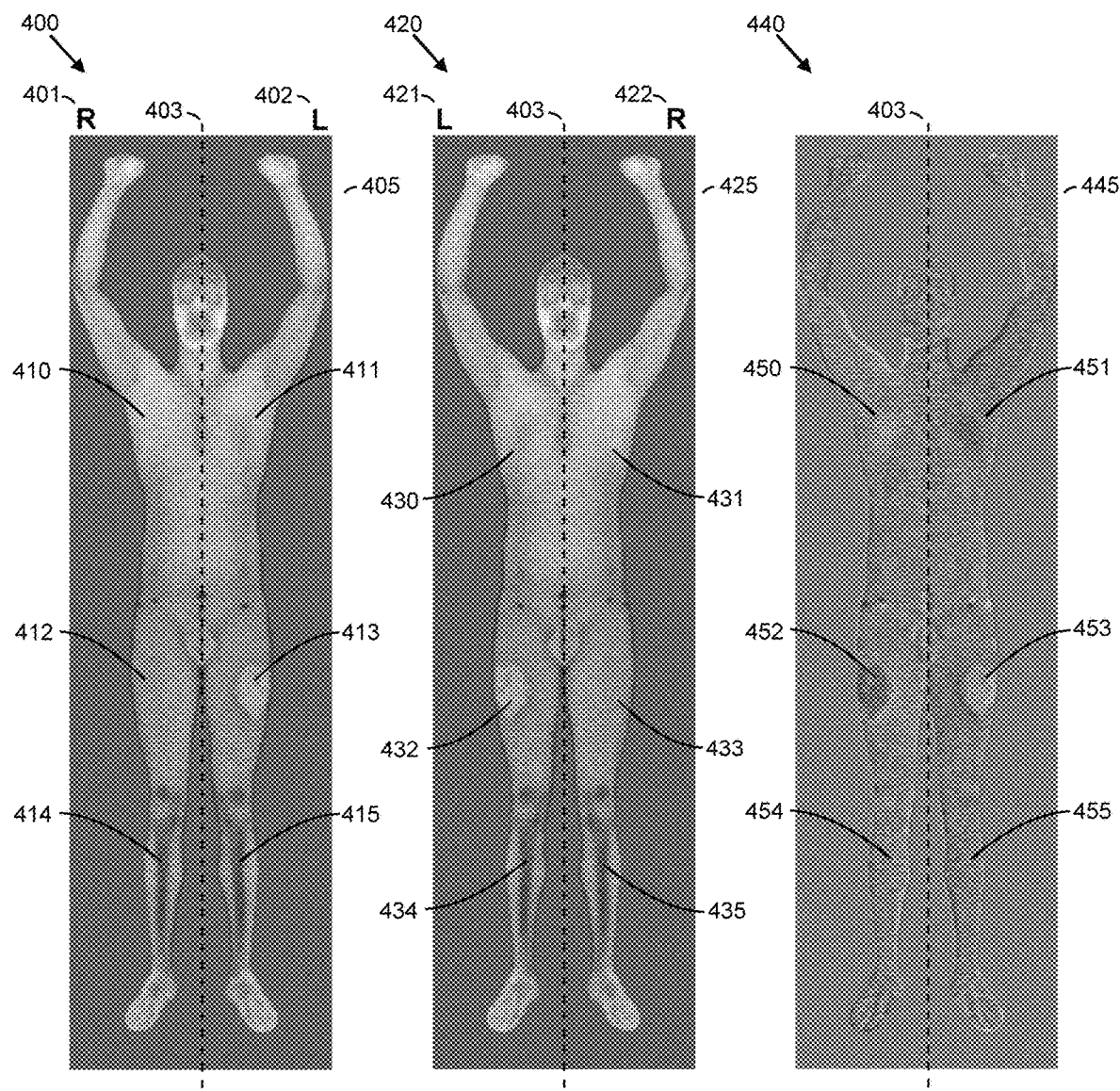
FIG. 7 is a depiction in accordance with the Present Invention.

FIG. 7 shows a continuation of a preferred embodiment of the Present Invention that builds on this bilateral symmetricalization of the body image. The leftmost illustration 400 is a warped image 405 from a body scanner, as described above, to have left-right symmetry around the image centerline 403. The right side 401 and left side 402, with reference to the person, are indicated. Several areas of interest are also indicated: A first concealed object 411, which is a barely detectable dark region; the corresponding symmetrical location 410; a second concealed object 413; the corresponding symmetrical location 412; the person's left shin 415; and the corresponding symmetrical location 414. The first concealed object 411 is just barely detectable by eye, while the second concealed object 413 and the shin bone 415 are obvious. These three cases are used as representative examples of anatomic versus non-anatomic features that must be separated by the ATR. The center illustration 420 is the warped image 405, but flipped left-for-right around the image centerline 403, creating a flipped image 425. Mathematically, if the warped image 405 is represented as x(r, c), where r runs from zero to N−1, and c runs from zero to M−1, then the flipped image 425 is given by x(r, M−1−c), with the centerline 423 located at c=(M−1)/two. This flips the left 421 and right 422 sides, as well as the location of all features in the image. In particular, the concealed object 411 is moved to 430, the second concealed object 413 is moved to 432, and the persons left shin 415 is moved to 434. The corresponding symmetrical locations 410 412 414 have moved to 431 433 435, respectively.

It can be appreciated by comparing the warped image 405 and flipped image 425 that the warping procedure has produced an exceedingly high degree of bilateral symmetry for the human anatomy. In fact, if the annotations and concealed objects were not present, it would be difficult to visually discern that a left-right flip was even present. On the other hand, the movement of the non-anatomic objects is obvious. This fundamental characteristic of body scanner images has been unappreciated in the prior art, and represents a powerful source of information for discriminating anatomic from non-anatomic features in ATR. Anatomy is highly symmetric, especially after warping, while non-anatomy is highly asymmetric. In this preferred embodiment the anatomic features are eliminated from consideration by subtracting the flipped image 425 from the warped image 405. This is shown in the rightmost illustration 440, consisting of the difference image 445 with annotation. This subtraction is performed on a pixel by pixel basis. That is, if the warped image 405 is represented as x(r, c), the flipped image 425 is given by x(r, M−1−c), and the difference image 445 is given by x(r, c)−x(r, M−1−c). As a practical matter, when electronic images are printed or displayed, a pixel value of zero is usually presented as pure black, with the maximum pixel value (e.g., 255 in an 8-bit image) being displayed as full white. However, the above described subtraction procedure can generate pixel values that are negative. As common in the art, the difference image 445 shown in FIG. 7 [and also the follow-on images in FIG. 8] has been offset to make pure black correspond to the maximum negative pixel value, pure white the maximum positive pixel value, and midrange gray to a pixel value of zero.

A key feature of the difference image 445 is that it is anti-symmetric with respect to the image centerline 403. That is, if a pixel has a positive value in the right half of the image, the corresponding pixel in the left half of the image will be the negative of this value, and vice-verse. This means that each side of the image contains complete information; the other side is simply a duplication of the pixel values with the sign changed. This can be seen in the first concealed object 411, a dark region in the warped image 405. In the difference image 445 this is correctly displayed as a dark region 451 at the same location on the body, but a bright appearing artifact 450 has been created at the corresponding symmetry location. Likewise, the second concealed object 413 is a bright region in the warped image 405, creating a correct bright region 453 at the same location in the difference image, plus a dark artifact 452 at the corresponding symmetry location. What is most important, the difference image 445 essentially contains no anatomic features. A striking example of this is the shin 415. In the warped image 405 this appears with high contrast and sharp edges, but has essentially vanished 454 455 in the difference image. In short, this procedure separates bilateral asymmetric regions from symmetric regions, thereby separating anatomic from non-anatomic image features. For ATR, the anatomic image features are ignored, while the non-anatomic image features are presented to the security officer as indicative of a concealed object.

Figure 8:
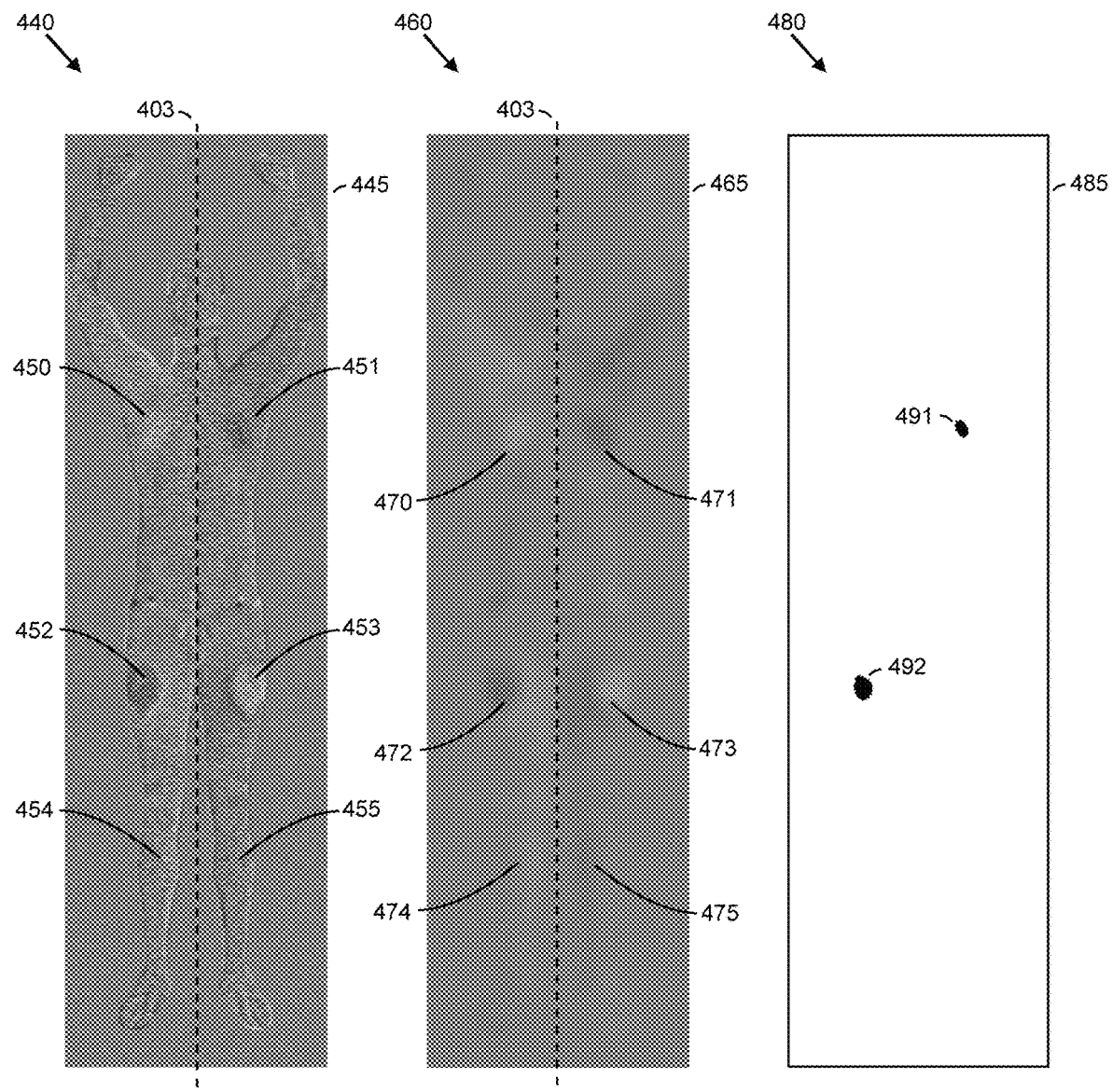
FIG. 8 is a depiction in accordance with the Present Invention.

FIG. 8 shows additional processing steps subsequent to those of FIG. 7. The leftmost illustration 440 in FIG. 8, is a reproduction of the rightmost illustration 440 in FIG. 7. The center illustration 460 in FIG. 8 shows the difference image 445 blurred by convolving it with a Gaussian filter kernel, creating a blurred image 465. This procedure is well known in the art of image processing, having the benefit of reducing random image noise, at the expense of making object edges less pronounced. Each region in the difference image 450 451 452 453 454 455 has a corresponding region in the blurred image 470 471 472 473 474 475, respectively. The rightmost illustration 480 in FIG. 8 shows the blurred image 465 thresholded to isolate the darkest regions, creating a threshold image 485. That is, any pixel in the blurred image that is darker than a threshold value is displayed as a black pixel in the threshold image 485, with all other pixels in the threshold image 485 appearing white. The first detected region 491 in the threshold image corresponds to the dark region 471 in the blurred image 465. However, since this has an artifact 470 associated with it, the correct interpretation is that the first detected region 491 corresponds to the pair 470 471. That is, it indicates that a dark object may be located at 471, or a bright object may be located at 470. Likewise, the second detected region 492 indicates that a dark object may be located at location 472 or a bright object may be located at 473. This ambiguity can be resolved by secondary algorithms if needed. In this preferred embodiment, this is done by examining these locations in the warped image 411 for the presence of edges. The correct interpretation (i.e., between 470 versus 471 and 472 versus 473) is where the image edges are the strongest in the original image 411, indicating a concealed object. The key result is that this procedure has successfully detected both concealed objects with no false alarms, in spite of the fact that one object was extremely weak, almost unnoticeable to human examination.

This procedure of flipping the image left-for-right, and then subtracting it from the original, can be understood in a variety of ways, all of which are correct. In one view this procedure is a filter: blocking features of the original image that are symmetric, while passing features that are asymmetric. In another view, this procedure nulls the left side of the image against the right side to eliminate anatomical features. In yet another view, this procedure processes the data to increase the signal-to-noise ratio. In this viewpoint, the signal is the totality of image features related to concealed objects, and the noise is the totality of image features related to anatomy. In other words, the signal is everything that needs to be detected, while the noise is everything that interferes with this detection. In the original image the signal-to-noise ratio is about one to one. That is, critical image features such as brightness, contrast and edge sharpness are generally about the same for concealed objects as they are for anatomy. This flip-subtract procedure removes essentially all image features that correspond to anatomy. This can be viewed as a tremendous reduction in the noise, resulting in an increase in the signal-to-noise ratio. In yet another view, this procedure is an even-odd decomposition. This is a technique in the art of signal processing, where a signal is decomposed into two additive parts, one having even symmetry (the left half of the signal is exactly symmetrical with the right half), and one having odd symmetry (the left half of the signal is exactly anti-symmetrical with the right half). The symmetry of anatomy is even, while the symmetry of concealed objects is a combination of even and odd symmetry. The procedure of flipping the image left-for-right, and then subtracting it from the original, is equivalent to calculating the odd part of each row in the image. That is, the difference image 445 is the odd part of the warped image 405, with respect to the vertical centerline.

Figure 9:
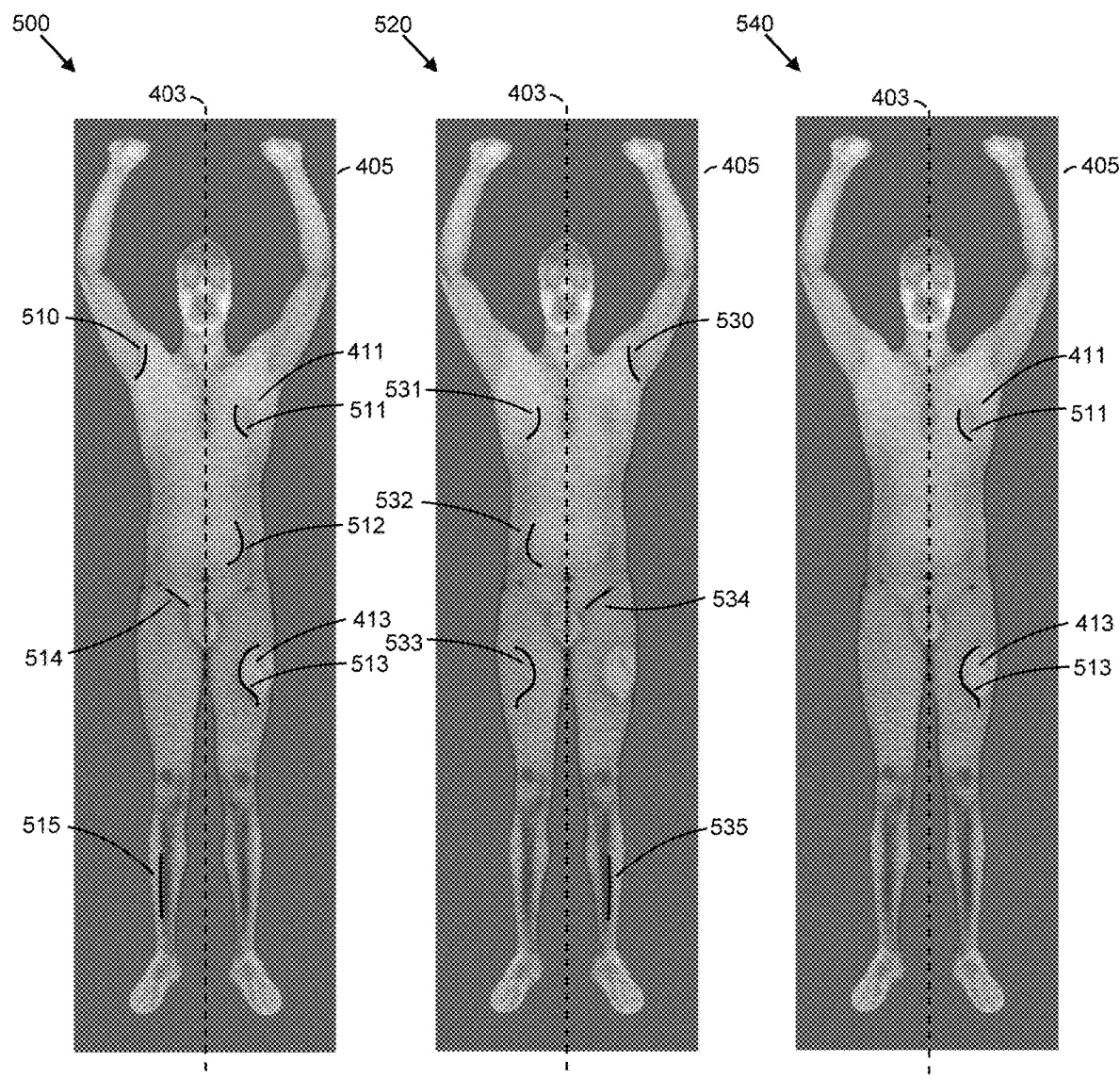
FIG. 9 is a depiction in accordance with the Present Invention.

FIG. 9 illustrates another preferred embodiment of the Present Invention. The leftmost illustration 500 shows the first step, carrying out the image symmetricalization procedure previously described, producing the warped image 405. The second step is to employ an edge detection algorithm to locate edge segments in the warped image 405. Many such algorithms are known in the art of image processing. In this preferred embodiment, a Canny edge detection is used, known in the art for its high ability to detect weak edges in noisy backgrounds. The operation of this algorithm is widely known and documented in many publications. It is a standard function in many software toolkits, such as Matlab. In the preferred embodiment, the Canny routine receives the warped image 405 and generates a corresponding image where the location of the edges are indicated by pixel values being set. For instance, the pixels where edges are detected may have a value of one, while all other pixels have a value of zero. This set of pixels inherently forms lines, corresponding to the edges in the warped image. These lines will be of different length, from less than an inch to potentially several feet referenced to the size of the person. In this preferred embodiment, these lines are broken into edge segments, each a few inches long, by simply separating the longer lines into pieces. All the pixels associated with an individual edge segment are grouped together, allowing them to be treated as a single computational object. That is, for example, one edge segment might consist of 20 pixels, with each of the pixels identified by their row and column location in the image. Referring to this edge segment is the same as referring to the totality of these 20 pixels. In the leftmost illustration 500 of FIG. 9, the warped image 405 has been annotated by superimposing six example edge segments 510 511 512 513 514 515. By inspection of the warped image 405, it can be seen that each of these edge segments corresponds to an edge in the image: some strong 513 515, some weak 510 511 512 514, some corresponding to anatomy 510 512 514 515, and some to concealed objects 511 513. The threshold of the Canny Edge Detection algorithm is set to a sufficiently low level that at least one edge segment will be generated for all possible concealed objects that require detection. This will typically result in hundreds of edge segments being found in the image. Only six edge segments are shown here, for explanatory purposes. This demonstrates that edge detection, by itself, is not capable of ATR. That is, when the edge detection threshold is made sufficiently low to detect concealed objects, the associated false alarm rate is enormous. The above procedure can generally be described as a first step of warping the image, then a second step of edge detection on the warped image to produce edge segments. However, this order can be reversed with essentially the same result. That is, the edge segments can be found in the acquired image before warping, then the edge segments are warped to find their location in the warped image.

In the third step, the sharpness of the edge is calculated for each of the edge segments. This is a numerical value which will be small for weak edges and large for strong edges. Algorithms for this calculation are well known in the art of image processing. In a preferred embodiment, it is calculated by identifying the group of pixels that are immediately adjacent to one side of the edge, and finding their average pixel value. Likewise, the average pixel value is found for the adjacent pixels on the other side of the edge. The edge sharpness is then calculated as the difference between the two.

In the fourth step, illustrated in the center illustration 520, each of the edge segments is relocated to its corresponding symmetry location, that is, flipped with respect to the centerline 403 of the image. The grayscale image 405 is not flipped, resulting in each of the edge segments being superimposed on the opposite side of the body. In this illustration the initial edge segments 510 511 512 513 514 515 become the flipped edge segments 530 531 532 533 534 535. The fifth step is to calculate the edge sharpness of the image 405, at the location of each of the flipped edge segments. The goal is to determine if there is a matching edge at this location, resulting from the symmetrical nature of human anatomy. However, there are enviably small variations in this symmetry. This is overcome by finding the maximum edge sharpness in a localized region around the flipped edge segment. In the preferred embodiment this is done by calculating the edge sharpness at a multitude of closely spaced locations, each with the flipped edge segment slightly offset in the vertical and/or horizontal direction. The maximum edge sharpness found in these measurements is taken as the edge sharpness for the flipped edge segment. In other words, the flipped edge segment is moved up, down, left, and right, a total distance of typically one inch, until a best fit is found.

In the sixth step, for each edge segment, the numerical value of the edge sharpness at the original location is compared to that at the flipped location. If a reasonable match is found, the edge segment is classified as resulting from anatomy, and is discarded from consideration. If a reasonable match is not found, the edge segment is classified as indicating a concealed object is present. This comparison can take many forms, such as taking the difference, thresholding or other nonlinear comparisons, or combining with other sources of information in arriving at a final conclusion. In this preferred embodiment, the sharpness at the original location is divided by the sharpness at the flipped location. A perfect match corresponds to a value of one for this calculation, and higher values indicate the degree of mismatch. Typically, a threshold of about two is used to classify whether a match has occurred or not. That is, values less than this threshold are classified as a match, while values greater than two are classified as not a match. The rightmost illustration 540 shows the result of this discrimination. In spite of being very faint, the sharpness of edge segment 511 is considerably larger than that of its flipped edge segment 531, as it therefore retained. In this same way, edge segment 513 is sharper than its corresponding flipped edge segment 533, and is also retained. All of the other original edge segments 510 512 514 515 are numerically about the same sharpness as their counterpart flipped edge segments 530 532 534 535, and therefore do not appear in the rightmost image 540. Accordingly, the above steps have accomplished the goal of ATR: all concealed objects 411 413 in the original image have been detected with no false alarms.

Figure 10:
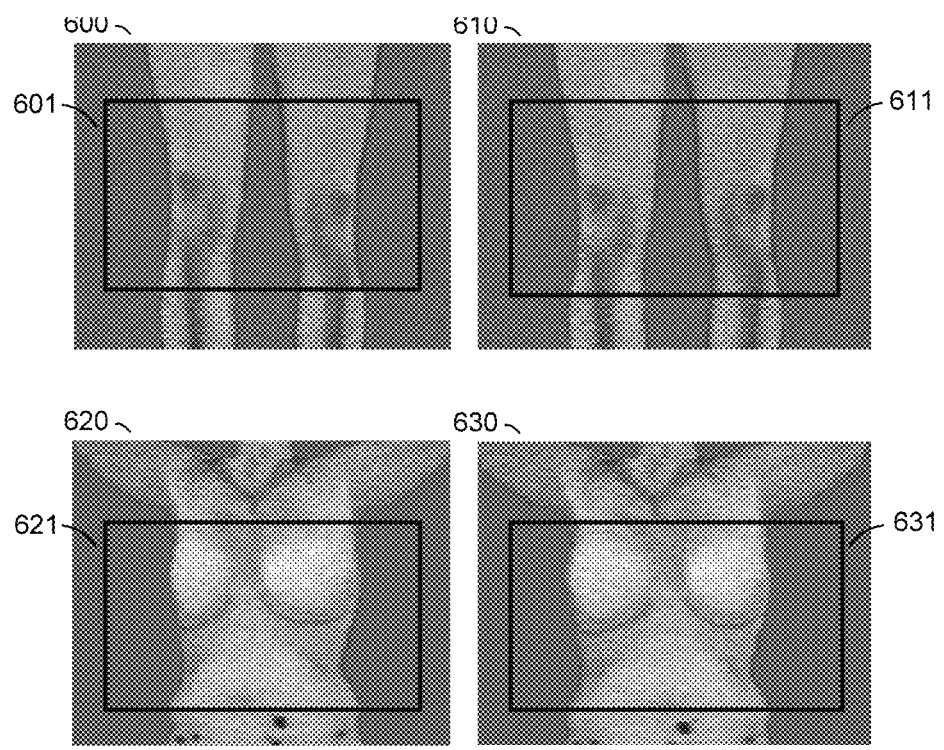
FIG. 10 is a depiction in accordance with the Present Invention.

FIG. 10 shows variations to the above described procedures within the scope of the Present Invention. The warping algorithms previously presented are based on using the body outline to achieve symmetricalization. This is sufficient for many uses of the Present Invention. As described above, small deviations from symmetry can be overcome by searching the area around the flipped edge segment for the best fit. However, there are additional steps that can improve the accuracy of the symmetricalization, thereby improving the overall performance of the Present Invention. From basic physics, six parameters are required to identify the position of an object in space: up-down, left-right, backward-forward, and a rotation about each of these axes. However, movement along three of these do not affect the left-right symmetry. Specifically, the person could move backward or forward while being scanned without changing the left-right symmetry in the acquired image. Likewise, the person moving up or down (such as standing on a stool) does not affect the left-right symmetry. Finally, rotating their body around the horizontal axis running from left to right does not alter the left-right symmetry in the image. This might correspond to, for example, the person keeping their feet in the same location and leaning their body backward or forward. All of these movements will affect how the person appears in the scanned image, but they do not alter how the left side corresponds with the right side. Therefore, they do not need to be considered in the symmetricalization procedure of the Present Invention.

The most important of the remaining three is the left-right shift. This corresponds to, for example, the person not being centered within the scanning window, or the person leaning to one side. This variation is fully corrected by warping the image such that the outline of the body is made symmetrical, the previously described procedure. That is, warping the outline of the body corrects for different left-right shifts at different locations on the body. In some body scanners this alone produces a sufficiently symmetrical image. However, adjustment of the other two degrees of freedom are possible with the Present Invention. The upper illustrations 600 610 in FIG. 10 show correction of the tilt, or more accurately, warping round the backward-forward axis. The original image 600 illustrates an example problem: the knee caps appear at different heights, as might be caused by the person standing with more weight on one foot, or a slight deformity of the body. This can be made symmetrical by applying what is known in the art of image processing as a shear transform, resulting in the corrected image 610. Box 601 in the original image 600 and box 611 in the corrected image 610 indicate the portion of the image where the shear transform has been applied. The remainder of the image is unaltered. This is to reinforce that this shear transform can be applied locally, that is, differently to different regions of the image. If the portion of the original image 601 is represented as x(r, c), then the portion of the corrected image 611 is calculated as x(r, k(c−CL)+c), where k is a parameter controlling the amount of tilt and CL is the centerline of the image.

The lower illustrations 620 630 in FIG. 10 show a rotational symmetricalization around the vertical or up-down axis, as may be needed if the scanned person is not squarely facing the scanner. As before, a portion 621 of the original image 620 is converted into a portion 631 of the rotated image 630. This is not simply a shift; each pixel near the center of the body is moved father than pixels near the body edge. If the portion 621 of the original image 620 is represented as x(r, c), then the portion of the rotated image is calculated as x(r, e1+p×sin($\pi$(c−e1)/(e2−e1))), where p is a parameter determining the amount of rotation, e1 is the left edge of the body in the image at row r, and e2 is the right edge.

Again, only the portions 621 631 within the images 620 630 are modified in the example, reinforcing that different sections of the image can have different rotational parameters.

In a preferred embodiment the tilt and rotation corrections are applied after the image is warped, to provide a fine tuning of the symmetricalization. The details of carrying out these types of procedures are well known in the art of image processing. In this preferred embodiment the amount of tilt and rotation, i.e., the values of k and p at various locations in the image, are determined by a best fit procedure. That is, the corrected image is repeatedly evaluated for symmetry while the values of k and p are systematically changed. The optimal values of k and p are where the symmetry is maximized. There are a variety of numerical measures of symmetry that can be used. In this preferred embodiment the measure of symmetry is the standard deviation of the difference between the image and the flipped image. That is, if the corrected image, after outline warping, tilt and rotation correction, is given by x(r, c), then the measure of symmetry at row r is given by SD[x(r, c)−x(r, N−1−c) for c=0 to N−1], where SD[ ] indicates taking the standard deviation of the operand. A minimum value of this calculation corresponds to maximum symmetry. The procedure to determine the values of k and p that minimize this value can be an exhaustive search of all k and p values, or an iterative algorithm such as steepest decent, as known in the art.

Figure 11:
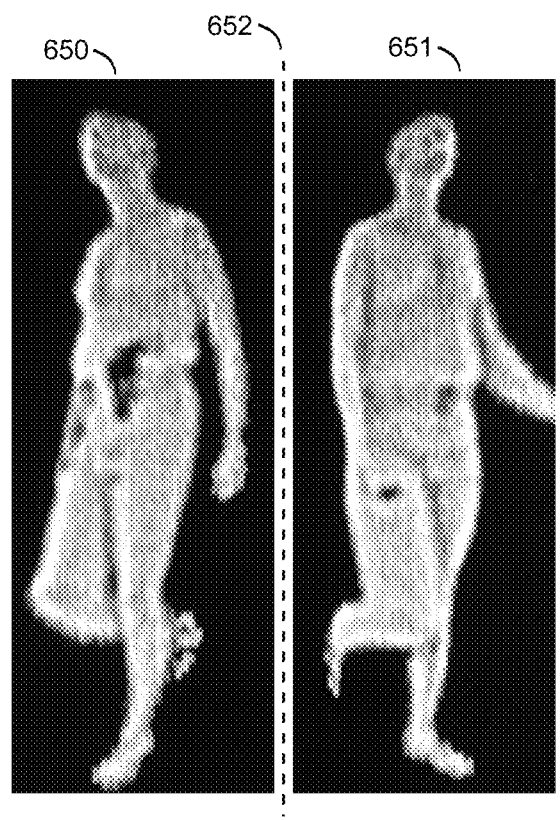
FIG. 11 is a depiction in accordance with the Present Invention.

As shown in FIG. 11, some body scanners acquire two or more overlapping images 650 651 of the person from different angular directions. In one case, this occurs as the person stands in front of the scanner and slowly rotates their body while successive images are acquired. In another case, this results from the person walking along a path with two or more scanners located on the sides of the path. In this case, the two or more images may be acquired simultaneously, or in rapid succession. Performing ATR of these types of images is also within the scope of the Present Invention. In FIG. 11 the two images 650 651 have left-right symmetry with respect to a vertical axis 652, which is outside of the images. Nevertheless, the steps for performing ATR on these images proceeds in accordance with the previously described embodiments. In particular, in a preferred embodiment for analyzing these types of images, the first step is to identify the outline of the body in both images. The second step is to identify fiducials on the body, such as the top of the head, shoulders, groin, etc. The third step is to identify additional fiducials by tracing the body outline between adjacent original fiducials. The fourth step is to use the bilinear or Affine transform to construct a spatial mapping between a pixel location in one image, and the location of the corresponding symmetry pixel in the other image. Fifth, a feature detection algorithm, such as edge, corner, or abnormal brightness, is used to identify features in the images that correspond to concealed objects, plus the enviable large number of false alarms. Sixth, the feature detection algorithm is performed at the corresponding symmetry location for each feature identified. Seven, if a reasonably matching feature is found at the corresponding symmetry location, the feature is deemed anatomy, and removed from consideration. All remaining features indicate concealed objects.

A neural network may also be used to implement the Present Invention, provided it has a configuration capable of: (1) receiving first data from a location in the body scanner image, (2) determining the corresponding symmetry location in the image, (3) receiving second data from this corresponding symmetry location, and (4) comparing the first data with the second data to determine the existence of a reasonable match between the image features at the two locations. These requirements can be fulfilled by a conventional neural network structure, provided that the inputs to the network include at least one full row of pixel values from the image being evaluated. As known in the art, a neural network will converge during training to a local minimum in the function relating error to network weights. As can also be appreciated by those skilled in the art, the computational solution taught by the Present Invention represents an extremely low value in this function, likely at or near the principle local minimum in the region, and perhaps even the global minimum. Further, the terrain surrounding this minimum has a gradual slope, which would promote convergence to this solution. While the algorithm used by a particular set of neural network weights is usually unknowable, given these factors it is likely that most or all convergence solutions would take advantage of the base teaching of the Present Invention. That is, that body anatomy is highly symmetric, and can effectively be eliminated by discarding all symmetric image features.

Although particular embodiments of the Present Invention have been described in detail for the purpose of illustration, various other modifications may be made without departing from the spirit and scope of the Invention. Different warping operations may be used to accomplish the same result as shift, rotate and/or tilt. The data representations at the various steps in the embodiments may be discrete, such as pixel values in a digital image, or mathematical, such as equations representing curves, or mathematical interpolations between discrete values. The computational platform to carry out the algorithms of the Present Invention may be a conventional sequential instruction computer, or a parallel hardware device such as an FPGA.

I claim:

1. A method for performing automated target recognition on a body scanner image of a subject, comprising:
    receiving by a digital computer, said body scanner image;
    spatially warping, by the digital computer, the body scanner image to generate a warped electronic image by:
        determining an outline of the body scanner image;
        identifying symmetric fiducials on said outline, wherein a first fiducial and a corresponding second fiducial is symmetric about a vertical axis centered along said subject;
        transforming the symmetric fiducials into symmetric quadrilateral pairs; and
        warping the symmetric quadrilateral pairs based on coordinates of the symmetric quadrilateral pairs;
    receiving by the digital computer, first data from a first location in said body scanner image corresponding to a first warped location in the warped electronic image;
    receiving by the digital computer, second data from a second location in said body scanner image, the second location corresponding to a second warped location in the warped electronic image, said second location being bilaterally symmetric to said first location, and said second location being derived from the first location;
    comparing, by the digital computer, one or more imaging characteristics exposed by said first data with one or more imaging characteristics exposed by said second data to detect a match;
    upon determining that a match exists between the one or more imaging characteristics exposed by said first data and the one or more imaging characteristics exposed by said second data, identifying, by the digital computer, said first data as corresponding to human anatomy; and
    outputting, from or in accordance with instructions from the digital computer, at least one of a visual and audible notification that a non-human anatomical element is present on or proximate to the subject's body upon a determination that no match between said first data and said second data exists.

2. The method of claim 1 wherein said first data is edge sharpness and said second data is edge sharpness.

3. The method of claim 2 wherein said comparing comprises dividing the first data edge sharpness and the second data edge sharpness.

4. The method of claim 2 wherein said first location is determined by a Canny edge detector.

5. The method of claim 1 wherein said first data comprises pixel brightness and said second data comprises pixel brightness.

6. An apparatus for the security screening of a person, comprising:
- a body scanner, said body scanner producing an electronic image of said person;
- a digital computer, said digital computer performing digital warping, the performance of digital warping comprising:
  - determining an outline of the electronic image;
  - identifying symmetric fiducials on said outline of the electronic image, wherein a first fiducial and a corresponding second fiducial is symmetric about a bilateral center of said outline of the electronic image;
  - transforming the symmetric fiducials into symmetric quadrilateral pairs; and
  - warping the symmetric quadrilateral pairs based on coordinates of the symmetric quadrilateral pairs to generate a warped electronic image; and
- said digital computer detecting bilateral asymmetric regions in said warped electronic image based on symmetrical image information generated using data derived from the electronic image, the symmetrical image information being determined based on a match existing between one or more imaging characteristics exposed by the warped electronic image and the electronic image, the bilateral asymmetric regions being determined based on one or more imaging characteristics exposed by the warped electronic image not matching that of the electronic image; and
- an annunciator, said annunciator presenting a representation of at least the bilateral asymmetric regions in response to the detection of said bilateral asymmetric regions.

7. The apparatus of claim 6 wherein said electronic image represents x-ray intensity.

8. The apparatus of claim 6 wherein said digital computer is contained within said body scanner, and said digital computer implements the scanning sequence of said body scanner.

9. The apparatus of claim 6 wherein said detecting bilateral asymmetric regions comprises calculation of image edge sharpness.

10. The apparatus of claim 7 wherein said annunciator is a visual display, said visual display comprising a generic human body graphic for positional reference.

11. A method for searching a person for concealed weapons, comprising:
- scanning said person with a body scanner device, said scanning producing an electronic image of said person;
- transmitting said electronic image to a digital computer;
- determining, by said digital computer, the bilateral centerline of said person in said electronic image;
- determining, by said digital computer, an outline of the electronic image;
- identifying, by said digital computer, symmetrical fiducials on said outline of the electronic image, wherein a first fiducial and a corresponding second fiducial is symmetric about a vertical axis centered along said outline of the electronic image;
- transforming, by said digital computer, the symmetrical fiducial into symmetric quadrilateral pairs;
- warping, by said digital computer, the symmetric quadrilateral pairs based on coordinates of the symmetric quadrilateral pairs to generate a warped electronic image;
- detecting, by said digital computer, features in said electronic image that are asymmetric with respect to said bilateral centerline using said warped electronic image, said electronic image comprising symmetrical image information based on a match existing between one or more imaging characteristics of said electronic image and warped electronic image; and
- issuing, by the digital computer or by one or more alarming devices operatively connected to the digital computer, an alarm that a concealed weapon is present if an asymmetric feature is detected.

12. The method of claim 11 further comprising digital warping said electronic image to maximize bilateral symmetry.

13. The method of claim 11 wherein said determining the bilateral centerline comprises identifying an outline of said person's representation in said electronic image, and identifying fiducials on said outline.

14. The method of claim 11 wherein the detected features are image edges.

15. The method of claim 11 wherein said scanning comprises: illuminating said person with x-ray radiation, detecting x-rays that are backscattered from the body of said person, and detecting x-rays that are transmitted through the body of said person.

16. The method of claim 15 wherein the detected features are image edges.

* * * * *